US 12,455,927 B1

United States Patent
Nayak et al.

(10) Patent No.: US 12,455,927 B1
(45) Date of Patent: Oct. 28, 2025

(54) MULTIMODAL TECHNIQUES FOR WEB INFORMATION EXTRACTION

(71) Applicant: Amazon Technologies, Inc., Seattle, WA (US)

(72) Inventors: Shrikant G Nayak, Bangalore (IN); Tejas Duseja, Naya Bazar (IN); Sathya Prakash Podila Venkata Subramanya, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 615 days.

(21) Appl. No.: 17/937,384

(22) Filed: Sep. 30, 2022

(51) Int. Cl.
  *G06F 16/951* (2019.01)
  *G06F 16/904* (2019.01)
  *G06F 16/958* (2019.01)
  *G06F 30/20* (2020.01)
  *G06F 30/27* (2020.01)
  *G06N 3/08* (2023.01)
  *G06N 20/00* (2019.01)

(52) U.S. Cl.
  CPC ............ *G06F 16/951* (2019.01); *G06N 3/08* (2013.01); *G06F 16/904* (2019.01); *G06F 16/958* (2019.01); *G06F 30/20* (2020.01); *G06F 30/27* (2020.01); *G06N 20/00* (2019.01)

(58) Field of Classification Search
  CPC .... G06F 16/951; G06F 16/904; G06F 16/958; G06F 30/20; G06F 30/27; G06N 3/08; G06N 20/00
  See application file for complete search history.

(56) References Cited

U.S. PATENT DOCUMENTS

| | | | |
|---|---|---|---|
| 8,566,102 B1 * | 10/2013 | Bangalore | G10L 15/22 704/270.1 |
| 10,223,616 B1 * | 3/2019 | Malin | G06F 18/24143 |
| 11,188,930 B2 * | 11/2021 | Chandra Sekar Rao | G06Q 30/0202 |
| 11,664,820 B2 * | 5/2023 | Gan | H03M 7/6011 706/41 |

(Continued)

OTHER PUBLICATIONS

Yuxin Wu, et al. "Detectron2: A PyTorch-based modular object detection library," ML Applications/ Open Source, Oct. 2019, pp. 1-10.

(Continued)

*Primary Examiner* — Michael J Jansen, II
(74) *Attorney, Agent, or Firm* — Robert C. Kowert; Kowert, Hood, Munyon, Rankin & Goetzel, P.C.

(57) ABSTRACT

A machine learning model for extracting information from web pages is prepared. The preparation includes generating respective representations of a first set of web pages, including embeddings from screenshots and bounding boxes of the web pages for multi-phase training of the model. In a first phase of training of the model, multiple loss functions associated with respective prediction tasks are optimized jointly, including a markup language element prediction task and a prediction of overlap between bounding boxes and screenshot subdivisions. In a second phase of training, using output of a hidden layer of the model (whose parameters were learned in the first phase) as input, a loss function is optimized to achieve a target web information extraction objective. The trained version of the model is stored.

20 Claims, 10 Drawing Sheets

(56) References Cited

U.S. PATENT DOCUMENTS

| | | | | |
|---|---|---|---|---|
| 2015/0310862 | A1* | 10/2015 | Dauphin | G06F 40/30 |
| | | | | 704/257 |
| 2022/0222277 | A1* | 7/2022 | Pasumarthy | G06Q 30/02 |
| 2023/0169364 | A1* | 6/2023 | Mueller | G06F 16/986 |
| | | | | 706/12 |
| 2023/0222285 | A1* | 7/2023 | Zhang | G06F 16/483 |
| | | | | 715/255 |
| 2023/0306071 | A1* | 9/2023 | Magureanu | G06F 18/241 |
| 2023/0419081 | A1* | 12/2023 | Tomooka | G06N 3/084 |

OTHER PUBLICATIONS

Yoshua Bengio, et al., "Unsupervised Feature Learning and Deep Learning: A Review and New Perspectives," CoRR https://arxiv.org/pdf/1206.5538v1.pdf, pp. 1-30, 2012.

William Cohen, et al. "A Flexible Learning System for Wrapping Tables and Lists in HTML Documents," WWW '02: Proceedings of the 11th international conference on World Wide Web, May 2002, pp. 1-20.

Vishwanath, D. et al. "Deep Reader: Information Extraction from Document Images via Relation Extraction and Natural Language" Published in 3rd International Workshop on Robust Reading at Asian Conference of Computer Vision, arXiv:1812.04377v2 [cs.CV] Dec. 14, 2018, pp. 1-17.

Jacob Devlin, et al., "BERT: Pre-training of Deep Bidirectional Transformers for Language Understanding," CoRR arXiv:1810.04805v2 [cs.CL] May 24, 2019, pp. 1-16.

Jukasz Garncarek, et al., "LAMBERT: Layout-Aware Language Modeling for Information Extraction" In: Document Analysis and Recognition—ICDAR 2021: 16th International Conference, Lausanne, Switzerland, Sep. 5-10, 2021, Proceedings, Part I, Sep. 2021, pp. 532-547, https://doi.org/10.1007/978-3-030-86549-8_34 (arXiv:2002.08087v5 [cs.CL] May 28, 2021).

P. Gulhane, et al., "Web-Scale information extraction with vertex," Published in: 2011 IEEE 27th International Conference on Data Engineering, 2011, pp. 1-12.

William L. Hamilton, et al., "Inductive Representation Learning on Large Graphs," Part of Advances in Neural Information Processing Systems 30 (NIPS 2017), arXiv:1706.02216v2, pp. 1-19.

Qiang Hao, et al., "From One Tree to a Forest: A Unified Solution for Structured Web Data Extraction," SIGIR '11: Proceedings of the 34th international ACM SIGIR conference on Research and development in Information Retrieval, Jul. 2011, pp. 775-784, https://doi.org/10.1145/2009916.2010020.

Alexandra Hotti, et al, "The Klarna Product p. Dataset: A Realistic Benchmark for Web Representation Learning," arXiv:2111.02168v2, pp. 1-17, 2021.

Mandar Joshi, et al., "SpanBERT: Improving Pre-training by Representing and Predicting Spans," Transactions of the Association for Computational Linguistics (2020) 8: pp. 64-77, https://doi.org/10.1162/tacl_a_00300.

Anoop Raveendra Katti, et al., "Chargrid: Towards Understanding 2d Documents," Published as a conference paper at EMNLP 2018, arXiv:1809.08799v1, pp. 1-11.

Johannes Kiesel, et al., "Reproducible Web Corpora: Interactive Archiving with Automatic Quality Assessment," ACM Journal of Data and Information Quality, vol. 0, No. 0, Article 0. Publication date: Aug. 2018, pp. 1-23.

Anurendra Kumar, et al., "CoVA: Context-aware Visual Attention for Webpage Information Extraction," arXiv:2110.12320v1, 2021, pp. 1-11.

Nicholas Kushmerick, et al., "Wrapper Induction for Information Extraction," IJCAI-97, University of Washington ProQuest Dissertations Publishing, 1997. 9819266 , pp. 1-7.

Junlong Li, et al, "MarkupLM: Pre-training of Text and Markup Language for Visually-rich Document Understanding," CORR arXiv:2110.08518v2, Mar. 2022, pp. 1-10.

Bill Yuchen Lin, et al., "FreeDOM: A Transferable Neural Architecture for Structured Information Extraction on Web Documents," KDD '20: Proceedings of the 26th ACM SIGKDD International Conference on Knowledge Discovery & Data Mining, Aug. 2020, pp. 1092-1102, https://doi.org/10.1145/3394486.3403153.

Xiaojing Liu, et al., "Graph convolution for multimodal information extraction from visually rich documents," arXiv:1903.11279v1, 2019, pp. 1-8.

Yinhan Liu, et al., "RoBERTa: A Robustly Optimized BERT Pretraining Approach," https://arxiv.org/abs/1907.11692v1, 2019, pp. 1-13.

Ilya Loshchilov, et al., "Fixing Weight Decay Regularization in Adam," CoRR abs/1907.11692, arXiv:1907.11692, 2019, pp. 1-13.

Telmo Pires, et al., "How multilingual is Multilingual BERT?," arXiv:1906.01502v1, 2019, pp. 1-6.

Stephen Soderland, "Learning Information Extraction Rules for Semi-Structured and Free Text," c 999 Kluwer Academic Publishers, Machine Learning 34, 2004, pp. 233-272.

Yiheng Xu, et al, "LayoutLM: Pre-training of Text and Layout for Document Image Understanding," KDD '20: Proceedings of the 26th ACM SIGKDD International Conference on Knowledge Discovery & Data Mining, Aug. 2020, pp. 1192-1200, https://doi.org/10.1145/3394486.3403172 (arXiv:1912.13318v3 2020).

Yang Xu, et al., "LayoutLMv2: Multi-modal Pre-training for Visually-Rich Document Understanding," arXiv:2012.14740v4 [cs.CL] Jan. 10, 2022, pp. 1-13.

Rex Ying, et al., "Graph Convolutional Neural Networks for Web-Scale Recommender Systems," KDD '18: Proceedings of the 24th ACM SIGKDD International Conference on Knowledge Discovery & Data Mining, Jul. 2018, pp. 974-983, https://doi.org/10.1145/3219819.3219890, (arXiv:1806.01973v1).

Yichao Zhou, et al., Simplified DOM Trees for Transferable Attribute Extraction from the Web, CoRR arXiv:2101.02415v1 [cs.LG] Jan. 7, 2021, pp. 1-10.

* cited by examiner

MULTIMODAL TECHNIQUES FOR WEB INFORMATION EXTRACTION

BACKGROUND

Modern websites use HTML (HyperText Markup Language), CSS (Cascading Style Sheets), Javascript and other techniques to represent combinations of unstructured, structured and tabular data in visually rich web pages. The field of web information extraction aims at converting schemaless semi-structured web pages to a structured format. Extracting information from web pages in an efficient and scalable manner across multiple websites which deal with similar topics but may have differing design and presentation approaches can present a non-trivial technical challenge.

Figure 1:
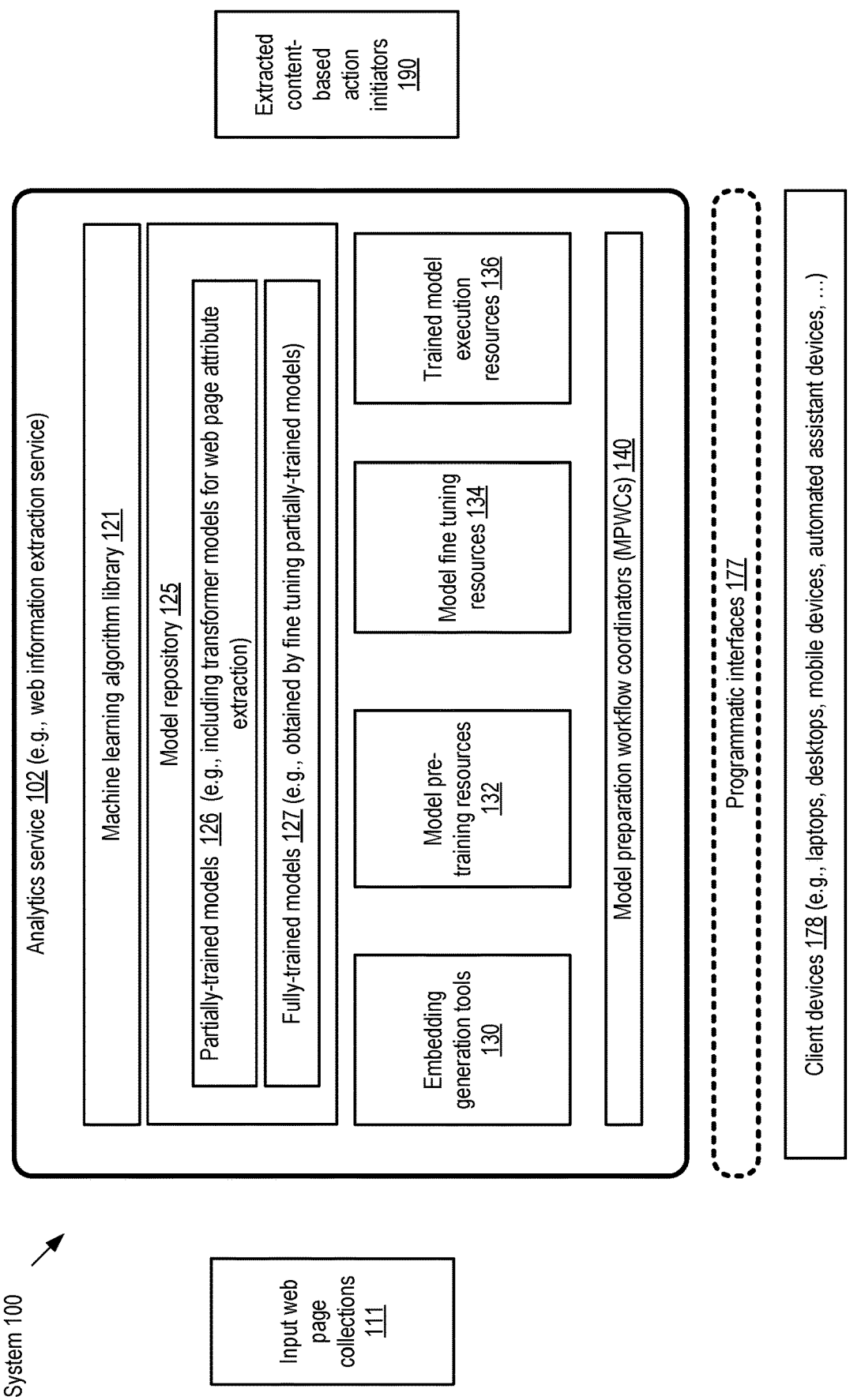
FIG. 1 illustrates an example system environment in which multimodal techniques may be employed for extracting information from web pages, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the term "set" should generally be interpreted to include one or more described items throughout this application. Accordingly, phrases such as "a set of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for automatically and accurately extracting information from complex modern web pages in a website-agnostic manner using machine learning techniques that take multiple interacting aspects of web page content into account. A given web page can convey information about one or more entities or items via several kinds of signals: some information can be contained in the raw text or images of the page, other information may depend on the locations at which the text or images are displayed relative to one another, the styles or format of the text, or even on markup language that is not directly visible in the displayed version of the web page. Accordingly, for information extraction purposes, content of a given web page can be examined or analyzed from several different perspectives referred to as modalities. For example, an image such as a screenshot of the rendered version of the page can be examined; this is a purely visual modality. The text modality refers to examining the text included in markup language (e.g., HTML) elements that make up the page, along with associated element properties also expressed using text. The manner in which the markup language elements are logically arranged relative to one another (e.g., in a tree structure) can be examined as part of a markup relationship modality, sometimes referred to simply as a markup modality. The layout modality refers to examining the relative positions (e.g., as indicated by bounding boxes) of different markup language elements on the rendered web page. Accurate interpretation of web page contents can require taking several different modalities, and interactions/relationships among the modalities, into consideration; taking only a single modality into account, as is done in some traditional web information extraction approaches, may be insufficient. For example, typically, if a page contains a primary image of an item (such as a product that can be ordered from an e-retail web site) as well as several other images that may represent related but less important items, the primary image is more likely to be positioned close to the title of the page, so the layout, text and markup modalities may have to be used together to classify the different components of the page correctly.

In various embodiments of the proposed techniques, a neural network based machine learning model (e.g., a model which includes at least a transformer encoder) whose input comprises vector embeddings corresponding to several modalities may be employed for extracting values of a target set of attributes of interest indicated in the content of web pages. For example, if the web pages of interest comprise information about products available at an e-retail web site, the target attributes may include product names, product cost, the primary image of the product that is displayed, and so on. As part of a preliminary phase of training the model referred to as pre-training, in at least some embodiments multiple prediction tasks that collectively utilize combinations of modalities may be performed using self-supervised learning techniques, with loss functions of the tasks optimized jointly to help ensure that interactions among the modalities are learned by the model. The preliminary phase may be followed by a second training phase in various embodiments, referred to as a fine tuning phase of the model, in which the pre-trained version of the model is enhanced (often but not necessarily always using supervised learning). Output from a hidden layer of the pre-trained model (e.g., the transformer encoder of the model), comprising learned representations of elements of another set of web pages (different from the web pages used for the preliminary phase), may be provided as input to a classifier layer of the model in the fine tuning phase in at least one embodiment. The output of the classifier may include predicted class labels for the targeted attributes, corresponding to respective elements identified within input web pages. Once the class labels (such as "product name") are obtained as part of the classification result, values (such as "Model MI phone" or "Running shoe RS1") of the corresponding targeted attributes may be easily extracted in various embodiments.

After the model has been fine tuned, it may be executed to extract attribute values from web pages (pages that were not used during the training), and the extracted values may be used for a variety of applications and use cases. At least partly because of the multimodal approach used during training, the model may be website-agnostic: that is, the model may be able to extract information from numerous different web sites that present the same kind of information. For example, if there are several different web sites which can be used to make hotel reservations, the model may be able to extract information about rooms and prices from several of the hotel reservation web sites. Furthermore, in addition to the model's generalizability across web sites, the model may also be able generalize over time with respect to any given web site. If a website designer changes the layout or overall look of a hotel reservation web site, for example, the model may still be able to extract information about rooms, prices, etc. without retraining, taking advantage of the fact that the model's parameters were learned based on multi-modal considerations and are not tied to any specific website layout or design. The model may be said to be scalable in at least two ways: firstly, values of any number of attributes may be extracted using the model, and secondly, only a small amount of labeled examples may be required for any given set of target attributes. In one example use case, the model may be utilized to fill gaps (i.e., to incorporate missing information) in the pages of one web site, based on information extracted from other web sites about the items or entities shown in the web pages of the first web site. In another use case, the extracted attribute values may be used to enhance the accuracy of responses provided by automated intelligent assistant devices or applications (e.g., voice-driven automated assistants). In addition to attribute value extraction, a variety of web page understanding tasks may be conducted using the trained model in different embodiments, such as answering natural language questions (e.g., "Is this dish vegetarian?" pertaining to an item shown on a restaurant web page), determining whether a given web page represents an entity of a particular type (e.g., a home improvement product versus an entertainment product), etc.

As one skilled in the art will appreciate in light of this disclosure, certain embodiments may be capable of achieving various advantages, including some or all of the following: (a) improving the quality and accuracy of information provided via web sites which may be accessed by large numbers of content consumers, e.g., by back-filling missing information in the web sites or verifying the correctness of the information in the web sites and/or (b) enhancing the user experience of users of automated assistant devices and software, by enlarging the set of queries for which the assistant devices and software can provide coherent and accurate answers. Furthermore, such advantages may be achieved without requiring vast amounts of input data to be labeled manually for training machine learning models, as a significant fraction of the training of the models may be completed using unlabeled data in the preliminary training phases, while only smaller amounts of labeled data may be needed for fine tuning.

According to some embodiments, a system may include one or more computing devices. The one or more computing devices may include instructions that upon execution on or across the one or more computing devices determine, at an analytics service of a cloud provider network, a set of target attributes for which respective values are to be extracted from web pages accessible from one or more web sites, wherein individual ones of the web pages comprise data about one or more entities or items whose attribute values are of interest and are therefore included among the targeted set of attributes. A neural network based model, such as a model comprising a transformer encoder which includes multiple self-attention heads, may be prepared to extract the attribute values at the analytics service in various embodiments. The preparation of the model may include multiple phases or stages, with several types of operations of one or more of the phases performed in parallel in some implementations.

As part of the preparation of the model, a first input data set for a first training phase of the model (also referred to as preliminary training or pre-training) may be identified or obtained in some embodiments. The first input data set may comprise data pertaining to a first plurality of web pages. With respect to a particular web page of the first plurality of web pages, for example, the first input data set may include at least (a) a screenshot or snapshot of the particular web page, (b) markup language content of the particular web page, and (c) a representation of respective bounding boxes associated with portions of content of the particular web page. The markup language content (e.g., HTML content) may indicate a plurality of elements arranged in accordance with a document model (such as DOM, the Document Object Model); an individual element of the plurality of elements may comprise a value of an attribute of the set of target attributes for which the model is being prepared. The bounding boxes may indicate the positioning of the markup language elements within the displayed or rendered version of the web page. In various embodiments, the first input data set may not include any labels usable for supervised learning.

Respective multi-modal embedding representations of the first plurality of web pages may be generated in various embodiments, and used as part of the input provided to the model (e.g., to the transformer encoder portion of the model) in the first phase of the training. A multi-modal embedding representation of a given web page may comprise embeddings of one or more of (a) respective subdivisions of the screenshot of the web page, (b) text content of respective elements of the plurality of markup language elements of the web page, (c) respective bounding boxes included in the first input data set for the web page and (d) respective document model paths (e.g., XPaths) of individual markup language elements of the web page in at least one embodiment. Parallelism may be employed in several different ways during the embedding generation in various embodiments: firstly, embeddings may be generated from different web pages in parallel, and secondly, with respect to a given web page, embeddings corresponding to the different modalities may be generated in parallel. The text content, bounding boxes and document model paths may all be obtained in some embodiments using logic similar to that used by browsers for rendering web pages to their users. Note that unlike some conventional web page analysis techniques, the proposed approach may not utilize OCR (optical character recognition) at any stage in various embodiments. OCR can introduce errors that are propagated and amplified during the model preparation process, and also has non-trivial performance overhead.

Preparation of the model may further include conducting or executing the first training phase of the model in various embodiments. The first training phase may comprise self-supervised learning in at least some embodiments. Generally speaking, self-supervised learning refers to techniques in which a model trains itself to learn about one part of the input (which may be masked or hidden) from another part of the input, without requiring labels to be provided; details of the different kinds of self-supervised learning utilized in the first training phase are provided below. In the first training phase, a set of parameters of the neural network based model, such as parameters of various layers of the transformer encoder, may be learned by jointly optimizing a plurality of multi-modal loss functions corresponding to several different tasks in some embodiments. The plurality of multi-modal loss functions may include, among others, a first loss function associated with the task of reconstructing text of a masked element of a web page, and a second loss function associated with the task of predicting overlap between (a) a masked subdivision of the screenshot or snapshot of a web page and (b) a bounding box of an element of the plurality of markup language elements of the web page. In some embodiments, loss functions associated with other tasks may also be used, such as a loss function associated with predicting coordinates of bounding boxes for one or more markup language elements of a web page, or a loss function associated with predicting distances (e.g., in terms of the number of edges that have to be traversed to reach one element from another) within a tree representation of markup language elements of a web page.

A second training phase of the model, referred to as fine tuning phase, may be conducted in various embodiments. The second training phase may comprise supervised learning to classify at least some markup language elements of web pages; as such, the loss function of the second training phase may correspond to the target web information extraction objective (extraction of values of classified markup language elements corresponding to target attributes) of the model. Classification results obtained from a version of the model which has undergone the second phase of training may be used to extract targeted attribute values in various embodiments. In one embodiment a multi-layer perceptron (MLP) classifier portion of the model (used in combination with the pre-trained transformer encoder) may be trained using the supervised learning. Input of the second training phase may include output of a hidden layer of the model (e.g., a hidden layer of the transformer encoder) corresponding to a second plurality of web pages (e.g., a set of web pages which were not used in the first training phase). At least some parameters of the hidden layer may have been learned in the first phase of the training in various embodiments. Note that parameters of various layers of the model, including the hidden layer shows output is provided as input to the classifier, may be modified during the second training phase in various embodiments.

In at least some embodiments, the preliminary training phase may be conducted using a larger input data set (e.g., embeddings of various kinds generated from N unlabeled web pages) than the fine tuning phase (e.g., embeddings generated from M labeled pages, with the labels indicating which markup language elements of the pages correspond to various ones of the target attributes whose values are to be extracted). In the first or preliminary phase, in effect the model may learn about the common aspects of web page structure, inter-modality relationships and factors indicating logical coherence between different components of a web page; after the preliminary phase, the generalized understanding capability achieved by the model may be applied to solve the specific problem of identifying web page elements that represent the target set of attributes.

After the fine tuning or second training phase is complete, the trained version of the model may be stored, e.g., at a repository of models of the analytics service. The trained model may be executed in various embodiments to perform any of several kinds of tasks associated with analyzing web pages. For example, in one embodiment, a response to a query pertaining to a web page (which was not among the web pages used during the training of the model) may be generated with the help of the trained model. The query may be submitted, in some cases, by a client of the analytics service via programmatic interfaces presented by the analytics service. In other cases, the query may be submitted to the analytics service by an application or device, such as an automated assistant application or device executing on behalf of an end user. The trained model may be used to classify one or more markup language elements of the web page indicated in the query, and a value extracted from one of the elements classified may be used to respond to the query. In one embodiment, contents of a first web page, which contains data about a particular entity or item, may be modified (e.g., to fill missing fields, or to correct errors) based on information extracted (after obtaining any needed permissions) using the model from a second web page which may have more complete or accurate data about the same entity or item. The trained model may be able to extract information accurately from web pages of numerous web sites, presented by different content providers, without requiring retraining in at least some embodiments.

In some embodiments, different machine learning models may be prepared for extracting values of respective sets of attributes from web pages. For example, for a first set of target attributes A1 whose values are to be extracted, a first model M1 may be trained using the multi-phase training approach outlined above; for a second set of target attributes A2, a different model M1 may be trained using a similar multi-phase training approach. In some cases, the preliminary training phase may not have to be repeated for different sets of target attributes; a given pre-trained model (whose first phase of training has been completed) may be re-used for several extracting values of different target attribute sets, with only the fine tuning phase having to be conducted again for each target attribute set.

In some embodiments, an analytics service may implement programmatic interfaces that can be used by clients to request the training of information extraction models. For example, a set of partly trained models (whose first phase or pre-training phase has been completed) may be maintained at the analytics service, and clients may submit requests via the programmatic interfaces to perform the second or fine tuning phase for a particular partly-trained model. The labeled data set that is to be used for the second phase may also be indicated via the programmatic interfaces in such embodiments. In one embodiment, a client of the analytics service may submit a request to perform both the pre-training and the fine tuning phases of preparing a model for web page attribute value extraction.

As indicated above, an analytics service used to prepare machine learning models for extraction of information from web pages using the techniques introduced above may be implemented at least in part using resources of a provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services. An analytics service implemented at such a cloud computing environment may also be referred to as a machine learning service in some embodiments.

FIG. 1 illustrates an example system environment in which multimodal techniques may be employed for extracting information from web pages, according to at least some embodiments. As shown, system 100 includes resources and artifacts of an analytics service 102 which may be implemented at a cloud computing environment or provider network. In some embodiments, the analytics service may be utilized for a number of different kinds of analysis applications; in other embodiments, the analytics service may be dedicated to information extraction from web pages, and may be referred to as a web information extraction service. The analytics service may include a machine learning algorithm library 121, a model repository 125, embedding generation tools 130, model pre-training resources 132, model fine tuning resources 134, trained model execution resources 136 and a collection of model preparation workflow coordinators (MPWCs) 140 in the depicted embodiment. The model repository may include some number of partially-trained models 126 and fully-trained models 127, with the fully trained models being obtained by fine tuning the partially trained models in at least some cases. Various components of the analytics service may be implemented using a combination of hardware and software of one or more computing devices in the depicted embodiment.

The analytics service 102 may implement a set of programmatic interfaces 177 in the depicted embodiment, such as web-based consoles, command-line tools, graphical user interfaces and/or application programming interfaces (APIs). Clients of the analytics service may submit various types of messages or requests to the analytics service using the interfaces 177 from a variety of client devices 178, such as laptops, desktops, mobile computing devices, automated assistant devices and the like, and receive response to those messages or requests via the interfaces. For example, clients may submit requests to train models for extracting specified sets of target attributes of interest represented within web pages of a particular website or a collection of websites, or to execute trained versions of the models to extract one or more target attributes.

In at least some embodiments, a determination may be made, e.g., at an MPWC 140 selected for a particular model, that values of a particular set of target attributes are to be extracted from web pages accessible from one or more web sites. A neural network based transformer model may be prepared using a multi-phase workflow or procedure to extract the attribute values. An input web page collection 111 comprising a plurality of web pages may be identified for one or more training phases of the model; in at least some cases, different sets of web pages may be used for a pre-training phase versus a fine tuning phase of the training. Corresponding to an input web page collection, a first input data set comprising screenshots or images of the pages, markup language content of the web pages (indicating a set of HTML elements of the web page) arranged in accordance with a document model such as DOM, and representations of respective bounding boxes of the markup language elements may be generated in various embodiments. The markup language elements may, for example, include text and or image as well as markup metadata (such as metadata about classes of the elements), and some of the contents of the elements may comprise values of one or more target attributes for which the model is to be prepared. The input web pages may not include labels that can be used for supervised learning for attribute extraction in at least some embodiments. The markup language elements and/or the bounding boxes may be obtained, for example, using logic that is typically included within web browsers-for example, developer tools available in various modern web browsers may indicate the HTML markup elements, bounding boxes etc.

An MPWC may utilize a set of embedding generation tools 130 in the depicted embodiment to prepare a number of embeddings from the web pages represented in the first input data set, to be used in turn as input for at least a first training phase (referred to as pre-training) of the neural network based model in the depicted embodiment. The embedding generation tools 130 may utilize various kinds of algorithms stored in the machine learning algorithm library 121 in some embodiments. Respective embeddings may be generated, for example, from respective subdivisions or sections of the screenshots of the web pages, from text content of the markup language elements of the web pages, from bounding boxes included in the first input data set, and/or from document model paths (e.g. XPaths) corresponding to the markup language elements. The embeddings for a given web page may be collectively referred to as multi-modal embeddings as they incorporate information associated with several different modalities of the kind introduced above.

The pre-training or first phase of training may be conducted using model pre-training resources 132 and the generated embeddings in the depicted embodiment. In at least some embodiments, the first phase of training may use self-supervised learning, with no labels required for at least a portion of the first input data set and the corresponding embeddings. In the first training phase, parameters of the model may be learned by jointly optimizing a plurality of multi-modal loss functions associated with respective pre-training tasks. The loss functions may include, among others, functions associated with reconstructing text of masked markup language elements of web pages, functions associated with predicting overlaps between masked subdivisions of the screenshot and bounding boxes of markup elements, functions associated with predicting masked subsets of the coordinates which are used to represent bounding boxes, and/or functions associated with predicting the logical distance (expressed in terms of the number of nodes or edges of tree representations of the markup language elements) between selected pairs of markup language elements of the web pages.

After the pre-training or first phase is completed for a particular attribute extraction model, a second training phase referred to as fine tuning may be conducted in various embodiments, e.g., using model fine tuning resources 134 and the pre-trained version of the model as a starting point. Note that in some cases, the same resources may be used for pre-training and fine tuning. In the fine tuning phase, a second input data set comprising a second plurality of web pages may be used. The second training phase may use supervised learning techniques in which the markup language elements of the input web pages are labeled to indicate the categories of information contained in the elements in at least some embodiments. Input to the second phase may comprise output of a hidden layer of the (pre-trained) model, which includes representations of the web page contents obtained using parameters learned during the first phase of the training in various embodiments. The objective of the second phase of the training may include learning model parameters which enable the model to classify the elements of the input web pages in at least some embodiments, with the target classes corresponding to the attributes whose values are to be extracted.

After the fine tuning phase is complete, the model may be considered fully trained in various embodiments. The partially trained version of the model obtained after the first phase of training may be added to the collection of partially-trained models 126, and the fully trained model may be included in the collection of fully-trained models 127. In response to receiving various types of queries or requests via programmatic interfaces 177, the fully trained version of a model may be executed to extract values of one or more attributes of web pages from various websites in the depicted embodiment. In at least some cases, the extracted values may be transmitted to one or more extracted content-based action initiators 190, such as tools that automatically modify/enhance content of other web pages and the like.

It is noted that in much of the following description, the markup language being used for web pages is assumed to be a version or variant of HTML, and DOM is assumed to be the document model used. Note that the web information extraction techniques described herein are not limited to any particular markup language or document model, and may be applied with equal success in scenarios in which markup languages other than HTML are used, or document models other than DOM are used.

Figure 2:
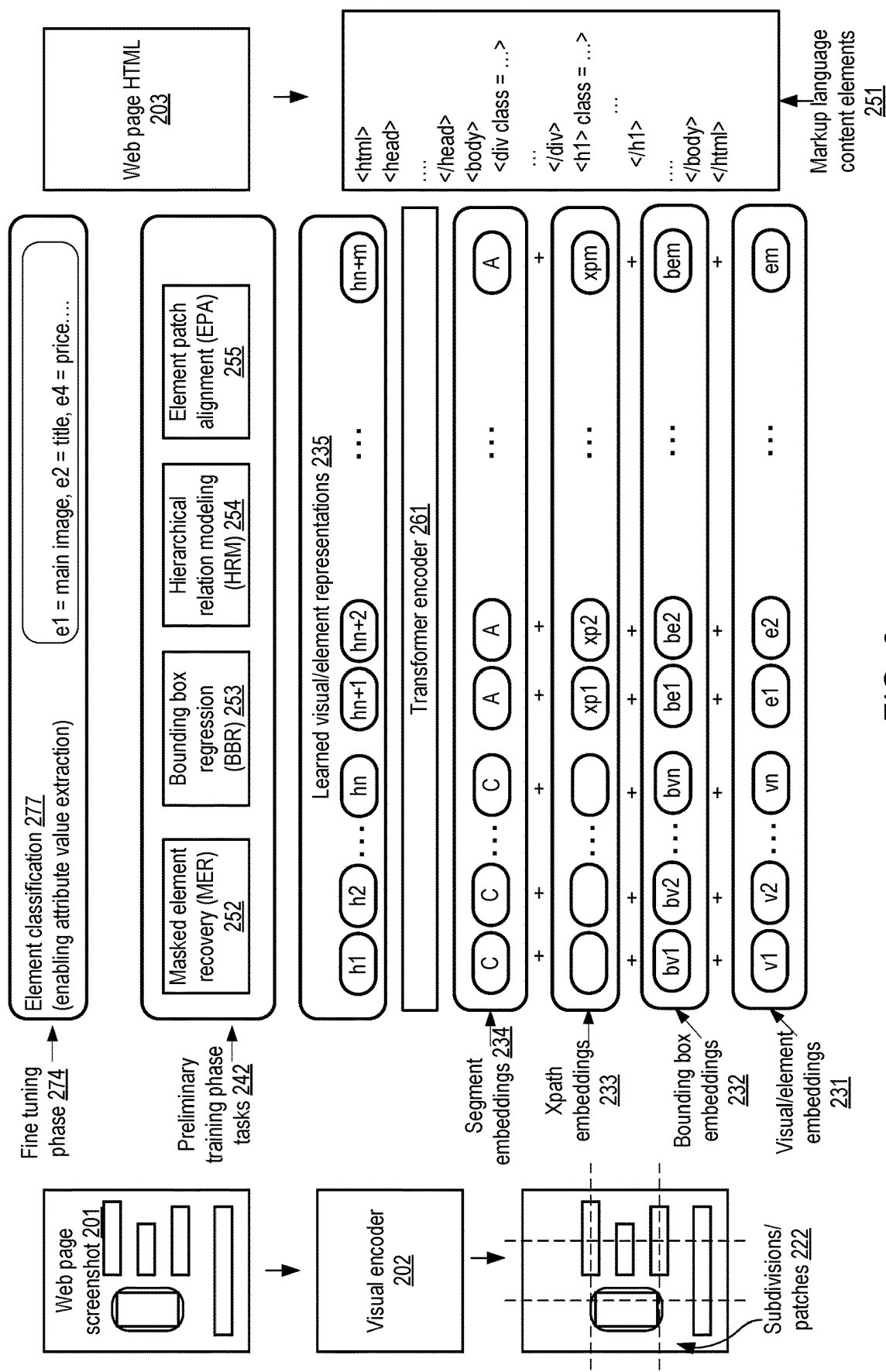
FIG. 2 illustrates an overview of an example multimodal machine learning based technique for extracting information from web pages, according to at least some embodiments.

FIG. 2 illustrates an overview of an example multimodal machine learning based technique for extracting information from web pages, according to at least some embodiments. To motivate the technique, it may be helpful to discuss the types of operations that are typically performed to display web pages. Generally speaking, the presentation of contents of a web page may involve at least three stages. In the first stage, the organization of the content of the page may be determined, e.g., by parsing the HTML content containing semantic markups indicating various kinds of HTML elements (expressed at least partly in text) into a DOM tree. The path to different HTML elements in the DOM tree is referred to as an XPath. In a second stage, a browser may parse the CSS information of the web page to generate a CSSOM (CSS Object Model) tree, and the DOM tree may be combined with the CSSOM tree to construct a render tree. A render tree is a visual representation of the DOM tree, containing only those elements which will be visible via the browser, e.g., on a screen of a laptop or phone. In a third stage, the positions and dimensions of each HTML element are computed to incorporate the layout information into the render tree. The final render tree is then transformed into the actual content shown.

Using information from only a single stage, without encoding relationships between the modalities of the different stages, may not be sufficient to accurately interpret or understand the content of the web page. For example, there may be numerous XPath representations corresponding to the same content, so the XPath alone may be insufficient to interpret the content. Additionally, adding an additional <span> HTML element can change the entire XPath, keeping the visual aspect of the page unchanged.

For at least these types of reasons, a machine learning model that takes multiple modalities into account, and also learns about relationships across modalities, may be employed in various embodiments. A given web page W may be represented as a set of N elements $\{e_1, e_2, \ldots, e_N\}$ obtained by traversing a DOM tree of W in document order (the order of occurrence of the corresponding HTML start tags in an XML (Extended Markup Language) version of the page, after expansion of entities). The target T of the model may be represented as a set of attributes or fields $\{t_1, t_2, \ldots, t_M\}$ of an entity (e.g., a product or item) represented in the web page. The particular elements which correspond to the target attributes may have to be identified using the model, and values of the attributes may be extracted from the identified elements. The overall web information extraction problem may be formulated as a web element multi-classification task that aims to learn a function $f(\theta):W \rightarrow T$, where $\theta$ represents the learned parameters of the machine learning model being developed.

The machine learning model used in various embodiments may comprise a neural network based transformer encoder with multiple self-attention heads, as well as a classification layer such as a multi-layer perceptron (MLP). Different hyperparameter values may be employed in respective implementations. In one implementation, for example, a 12-layer transformer encoder with 12 self-attention heads, a hidden size of 768, and feed-forward networks of size 3072 may be used.

A multi-phase procedure for preparing the model may be implemented in various embodiments. The input of the preparation procedure (which may include data pre-processing as well as training operations) may comprise, for individual web pages of a first plurality of web pages, the HTML content indicating various HTML elements, a screenshot or overall image of the page as it may be seen by end users, and bounding box information corresponding to the HTML elements. An HTML element is a component of an HTML web page which typically starts with a start tag indicating the name of the element (e.g., the string "<tagname>", where tagname is the element name), ends with a corresponding termination string. In some cases, the termination string may include an end tag (e.g., "</tagname>"); in other cases, as in <br/>, an end tag may not be used. Additional content may be included between the start tag and the termination string of some HTML elements. A number of different kinds of embeddings may be generated from the web pages in different embodiments, collectively representing several different modalities.

As shown in FIG. 2, a visual encoder 202 may be used to encode a web page screenshot 201 of the input data set. The encoded representation of the page image or screenshot may be partitioned into portions referred to as subdivisions/patches 222 in the depicted embodiment. To obtain the subdivisions, in some embodiments, the screenshot or snapshot of each of the web pages of the input data set may be resized to a particular size (e.g., 224×224 pixels in one implementation) before it is passed through the visual encoder 202 (e.g., an encoder based on ResNext-FPN in some implementations). The output feature map of the encoder may be average pooled (e.g., with the shape of the pooling layer set to width=w1, height=h1) to generate a number (e.g., w1×h1) of subdivisions or patches. These patches may in turn be passed through a linear projection to obtain patch embeddings. The patch embeddings are depicted using the labels v1, v2, . . . , vn in the visual/element embeddings 231 of FIG. 2, and represent the visual modality of information pertaining to the web page. The total number of visual/element embeddings for a given web page may be the sum of the total number of patches (n) and the total number of HTML elements (m) in the depicted embodiment.

From the web page HTML 203 of the same web page, markup language content elements 251 may be identified, and their embeddings (e1, e2, . . . , em) may be generated as well in the depicted embodiment. Property values of HTML elements, such as the "class" property, model the organizational content of the corresponding web page. The class property may be useful in correlating elements across web pages from different web sites, as it is likely to have the similar values (e.g., "list-price" on one web site, "price" on another web site, "base price" on a third web site, etc.) for similar kinds of information in the respective web sites. In at least some embodiments, the entire element may be considered as an atomic entity, instead of for example generating embeddings of individual tokens within the text of an element. For each element of the DOM tree, the corresponding text (if any) representing content, as well as one or more property values may be passed separately through a language model (e.g., a pre-trained ROBERTA language model), added and passed through a linear layer to generate an element embedding such as e1, e2, . . . included in the visual/element embeddings 231.

Bounding box embeddings 232 may be generated as follows in some embodiments. Coordinates of the HTML elements within the web page may be normalized to a range (e.g., 0-1000), and each element's bounding box may be represented as a 6-element tuple $((x_{min}/W'), (y_{min}/H'), (x_{max}/W'), (y_{max}/H'), (w/W'), (h/H'))$ where w and h are the width and height of the element, W' and H' represent the width and height of the snapshot/screenshot, and $x_{min}$, $y_{min}$, $x_{max}$ and $y_{max}$ represent the minimum x-axis coordinate, the minimum y-axis coordinate, the maximum x-axis coordinate, and the maximum y-axis coordinate respectively of the element. Six embedding layers may be used to embed the bounding box values for individual elements via a linear mapping function. In some embodiments, bounding box embeddings may be generated for the patches as well as the HTML elements. The bounding box embeddings bv1, bv2, . . . , bvn may correspond to the patches, while the bounding box embeddings be1, be2, . . . , bem may correspond to the HTML elements. The bounding box embeddings may in effect encode the layout semantics of the web page from a visual perspective in various embodiments.

To generate the XPath embeddings 233 (which may only be created for the HTML elements of the web page, and not for the patches of the screenshot, hence the blank components on the left side of the XPath embeddings layer), the following approach may be taken in various embodiments. The XPath expression for each HTML element may be split into tokens using "/" as the delimiter (e.g.,/html/body/div[2] may yield tokens "html", "body" and "div[2]"). Individual tokens may be further subdivided into tags (such as "div" in the div[2] example) and subscripts ("2" in the div[2] example). Two embedding layers may be used to embed the tag and subscript separately. The embeddings of the tag and the subscript may be concatenated to obtain an intermediate representation, which may then be fed into a feed forward neural network layer to obtain a final embedding for the entire XPath. This may in effect encode the semantics of the web page from a markup perspective, and may thus represent the markup modality.

In the embodiment depicted in FIG. 2, segment embeddings 234 may also be generated. A segment label "C" may be assigned to the visual portions of the input, and a segment label "A" may be assigned to the portions corresponding to HTML elements. These segments may help the model to distinguish whether an input is visual-related or element-related. The visual/element embeddings, bounding box embeddings, XPath embeddings and segment embeddings may be combined and provided as input to the transformer encoder 261 in the depicted embodiment, as indicated by the "+" symbols shown between the embeddings in FIG. 2. Other combinations of embeddings of the input web pages may be used in some embodiments. The transformer encoder may generate the learned visual/element representations 235 (h1, h2, . . . , hn+m) of the combination of visual/patch and HTML element inputs in the depicted embodiment.

To help integrate the interactions among different modalities, the following self-supervised preliminary phase training tasks 242 (also referred to as pre-training tasks) may be conducted in the embodiment depicted in FIG. 2: a masked element recovery (MER) task 252, a bounding box regression (BBR) task 253, a hierarchical relation modeling (HRM) task 254, and an element patch alignment (EPA) task 255. Other combinations of preliminary phase training tasks may be used in some embodiments. Loss functions associated with each of the preliminary phase training tasks may be optimized jointly to learn the parameters of the transformer encoder in the depicted embodiment.

In the MER task 252, a selected fraction of the HTML elements of the input web page are hidden or masked, and the model attempts to reconstruct the entire element be regressing the ground truth of the masked element. The MER loss function may be defined as the L1 distance between the final representation of each masked element to its ground truth embeddings obtained from a language model similar to a pre-trained ROBERTa language model. In a masking scheme used for the MER task in one implementation, 15% of the elements in a given web page may be masked, with element lengths (in number of words) chosen so as to select a distribution that tends to pick element samples with shorter lengths. 80% of the selected elements may be replaced by a special token "<mask>", 10% are replaced with other random elements, and the rest may remain unchanged in this implementation.

In the BBR task 253, some of the coordinate values of a selected fraction of the elements' bounding boxes are masked, and the model attempts to predict the masked coordinates. Given predicted values of masked bounding box coordinates p=(px, py, px', py'), (where x and y refer to the smaller normalized coordinates of the bounding box along the two axes and x' and y' refer to the larger coordinates) and the ground truth coordinates (gx, gy, gx', gy'), a regressor is configured to minimize the localization loss (smooth L1 loss) between p and g. In one implementation, 15% of the bounding boxes may be selected for masking using random selection, and values of at most 3 coordinates may be replaced with random values 80% of the time. 10% of the time, in such an implementation all the coordinate values of the selected bounding boxes may be masked, and the rest of the coordinates may be left unchanged.

The hierarchical relation modeling (HRM) task 254 may be employed to make the model learn the degree of semantic closeness between elements of a web page in the markup context in the depicted embodiment. The semantic closeness may be expressed by an order number, indicating the maximum distance of either element of a pair of elements from their least common ancestor in terms of XPaths. For example, if one element's XPath is /A/B/C/D/E and another element's XPath is /A/B/C/F/G/H, the least common ancestor would be "C", and the maximum distance of either element from C would be three (because three XPath elements have to be traversed between C and H in /A/B/C/F/G/H, while only two elements would have to be traversed between C and E in /A/B/C/D/E). The valid choices for order numbers may be set to {1, 2, 3, n} in some embodiments, where n represents values greater than 3. The HRM task may be modeled as a classification problem that predicts the order number for selected element pairs. The loss function corresponding to the HRM classification may force the model to encode information about the hierarchical structure of the DOM tree corresponding to the XPath embeddings. In one implementation, 15% of the possible pairs of HTML elements of a web page may be chosen at random for classification, and from that selection element pairs may be chosen in the ratio 1:1:1:2 corresponding to the possible order numbers 1, 2, 3 and n.

The element patch alignment (EPA) task 255 may be used to bridge the alignment gap between the text and image modalities and acquire a more global understanding of a web page. Image regions corresponding to some of the bounding boxes of sampled HTML elements may be masked, and a loss function associated with predicting whether a particular patch corresponding to an HTML element on the web page is masked or not may be used. In one implementation, 15% of the bounding boxes of elements may be masked.

A partially-trained version of the neural network based model may be obtained using the preliminary phase. In a fine tuning phase 274 of the training, supervised training may be used to classify individual elements of the web page. The element classification 277 may enable attribute value extraction (e.g., once the HTML elements that represent respective target attributes are identified, the corresponding values may be easily extracted from the web page). In effect, the model may learn to predict which (if any) of the HTML elements on the page represents each of the target attributes (such as main image, title, price) of interest. A second plurality of web pages (different from the plurality of web pages used for the preliminary phase) may be labeled and used for the fine tuning phase, and an MLP (multi-layer perceptron) may be used as the classifier in at least some embodiments. In addition, input for the fine tuning phase may include output from a hidden layer of the transformer encoder, whose parameter values were learned during the preliminary phase.

Figure 3:
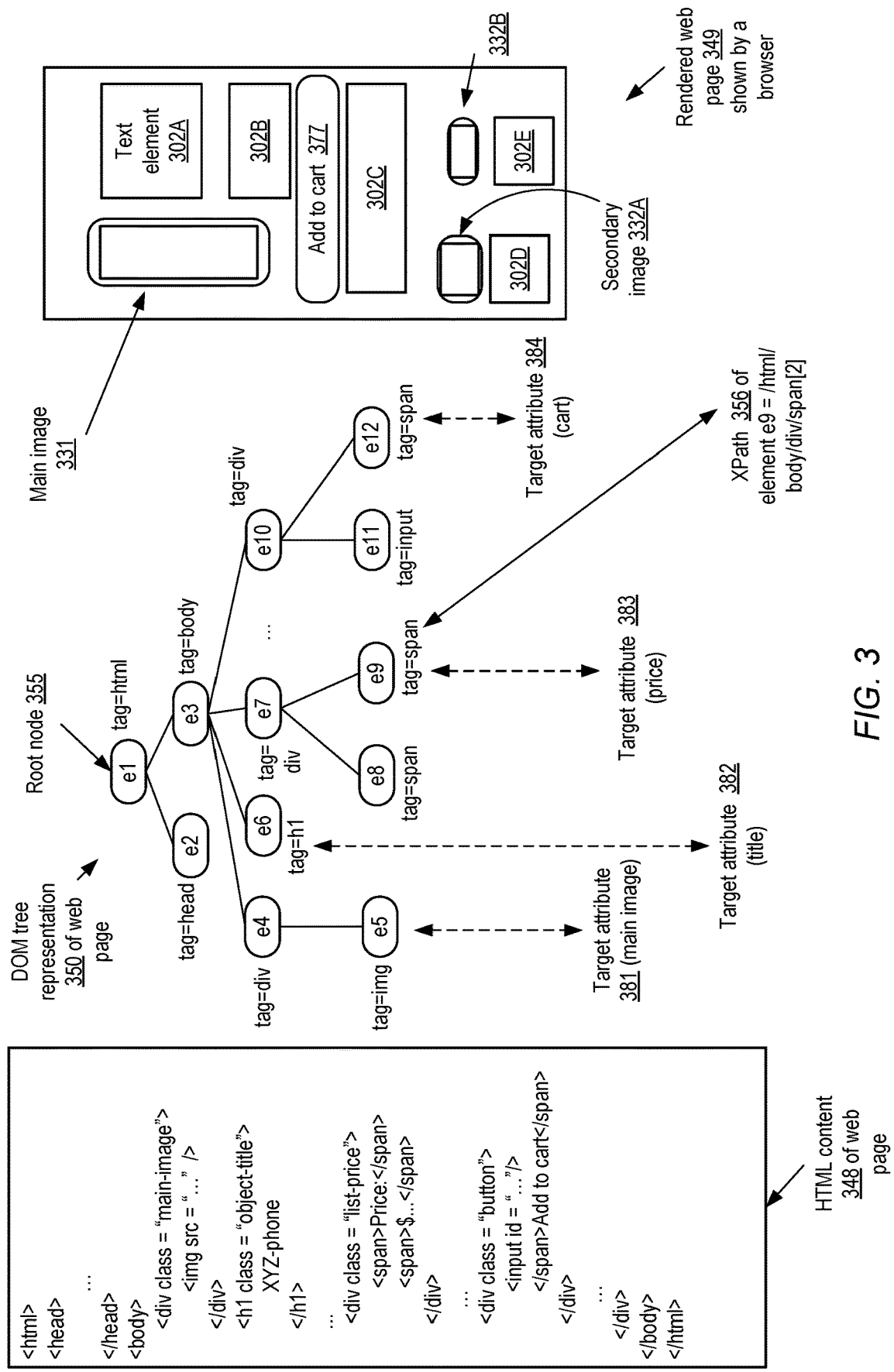
FIG. 3 illustrates example representations of a web page which can be utilized in the process of extracting information from the web page, according to at least some embodiments.

FIG. 3 illustrates example representations of a web page which can be utilized in the process of extracting information from the web page, according to at least some embodiments. HTML content 348 of the web page may indicate the HTML elements which form the web page. Each element may begin with a start tag and end with a corresponding end tag in the depicted web page: for example, corresponding to the start tag <head>, the end tag </head> may be used. The rendered web page 349 shown by a browser is the view seen by end users of the web page. The rendered view may include, among others, a main image 331, an add to cart button 377, secondary images 332A and 332B, and text elements 302A, 302B, 302C, 302D and 302E.

As mentioned above, a DOM tree representation 350 of the web page may be generated during the process of displaying or presenting the page. The DOM tree may comprise a plurality of nodes (labeled e1, e2, etc.) representing respective elements and a plurality of edges representing containment and other relationships among the elements. In many cases, the manner in which the elements are arranged in the tree also indicate semantic relationships among the elements, which can be beneficial in interpreting or understanding the web page contents. In the example shown in FIG. 3, the root node 355 corresponds to an html tag and element e1. The head tag is represented by node e2, and the body tag is represented by node e3. One branch of the portion of the DOM tree corresponding to the body, starting at node e3, includes node e4 (representing the first div tag in the body) and e5 (an image tag which indicates the source of the main image 331, which is a target attribute 381 whose value may be extracted from the web page). A second branch starting at node e3 includes node e6, representing the h1 tag whose content represents a second target attribute 382 (the title of the primary item or object shown on the web page). A third branch starting at e3 includes e7 (a div tag) which in turn leads to nodes e8 (a span tag for the text "Price:") and e9 (a second span tag containing the actual price of the primary item, which is another target attribute 383). Another branch starting at e3 includes e10 (a div tag with class="button"), e11 (an input tag) and e12 (a span tag for the "Add to cart" button), with e12 corresponding to a fourth target attribute (the cart). Each of the nodes has a respective XPath based on the DOM tree; for example, the XPath 356 of element e9 may be determined as /html/body/div/span[2].

The HTML content, XPaths, and rendered views (in which respective elements are shown within respective bounding boxes) may each provide some information about the content of the web page, corresponding to a respective modality. By taking several of the modalities into account together during training of a machine learning model for attribute value extraction as described above, a more accurate and complete understanding or interpretation of web pages may be enabled than if just one of the modalities were considered.

Figure 4:
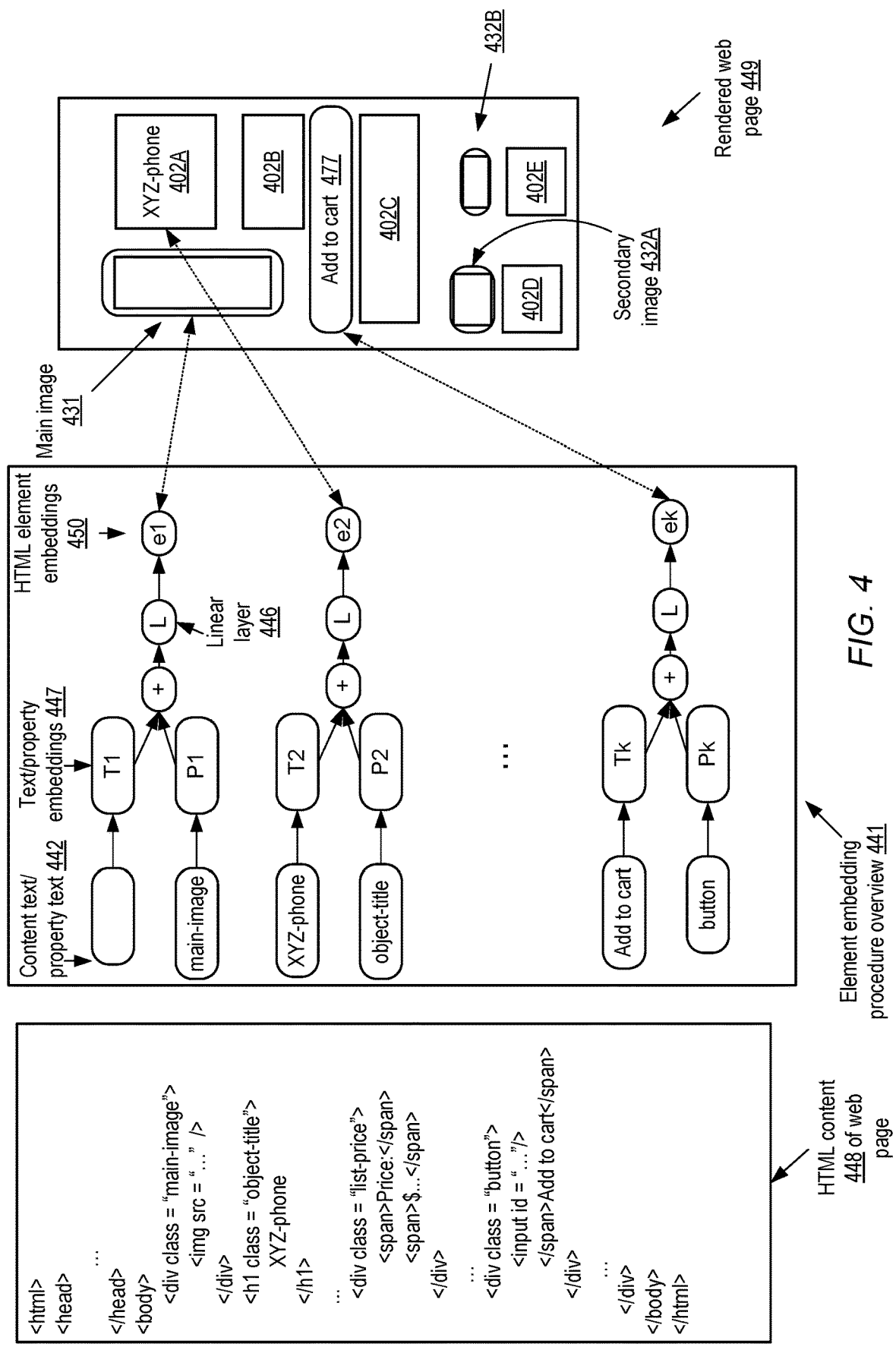
FIG. 4 illustrates an example technique for generating embeddings of HTML elements which can be utilized to extract information from the corresponding web pages, according to at least some embodiments.

FIG. 4 illustrates an example technique for generating embeddings of HTML elements which can be utilized to extract information from the corresponding web pages, according to at least some embodiments. In the embodiment depicted in FIG. 4, the HTML content 448 of an example web page may be analyzed to identify the constituent HTML elements. The rendered web page 449 may include, among other constituents, a main image 431, an add to cart button 477, secondary images 432A and 432B, and several text elements such as 402A, 402B, 402C, 402D and 402E.

At least some of the HTML elements may have both content text (such as "XYZ-phone" in the case of an h1 element) and one or more properties (e.g. "class= "object-title"") which are also expressed using text; other elements may not have text content or properties. As part of the element embedding generation technique used in one embodiment to obtain input used during training, respective embeddings 447 of the content text 442 and one or more property values may be generated first as shown in element embedding procedure overview 441. For example, with respect to the h1 element with class="object-title", an embedding T2 of "XYZ-phone" may be generated, and an embedding P2 of the property class name "object-title" may be created. The embeddings of the content text and the property may then be combined (as indicated by the +element) and passed through a linear layer 446 (represented by "L") to generate the final HTML element embedding (e2) corresponding to the text element 402A. Similar operations may be performed to obtain embeddings 450 of various other HTML elements, such as embedding e2 corresponding to the main image 431, and embedding ek corresponding to the add to cart button 477. The element embeddings may thus take element properties (such as the class of different elements) as well as text content into account in the depicted embodiment. As indicated in FIG. 2, such element embeddings may be included in the input used for an attribute extraction machine learning model in at least some embodiments.

Figure 5:
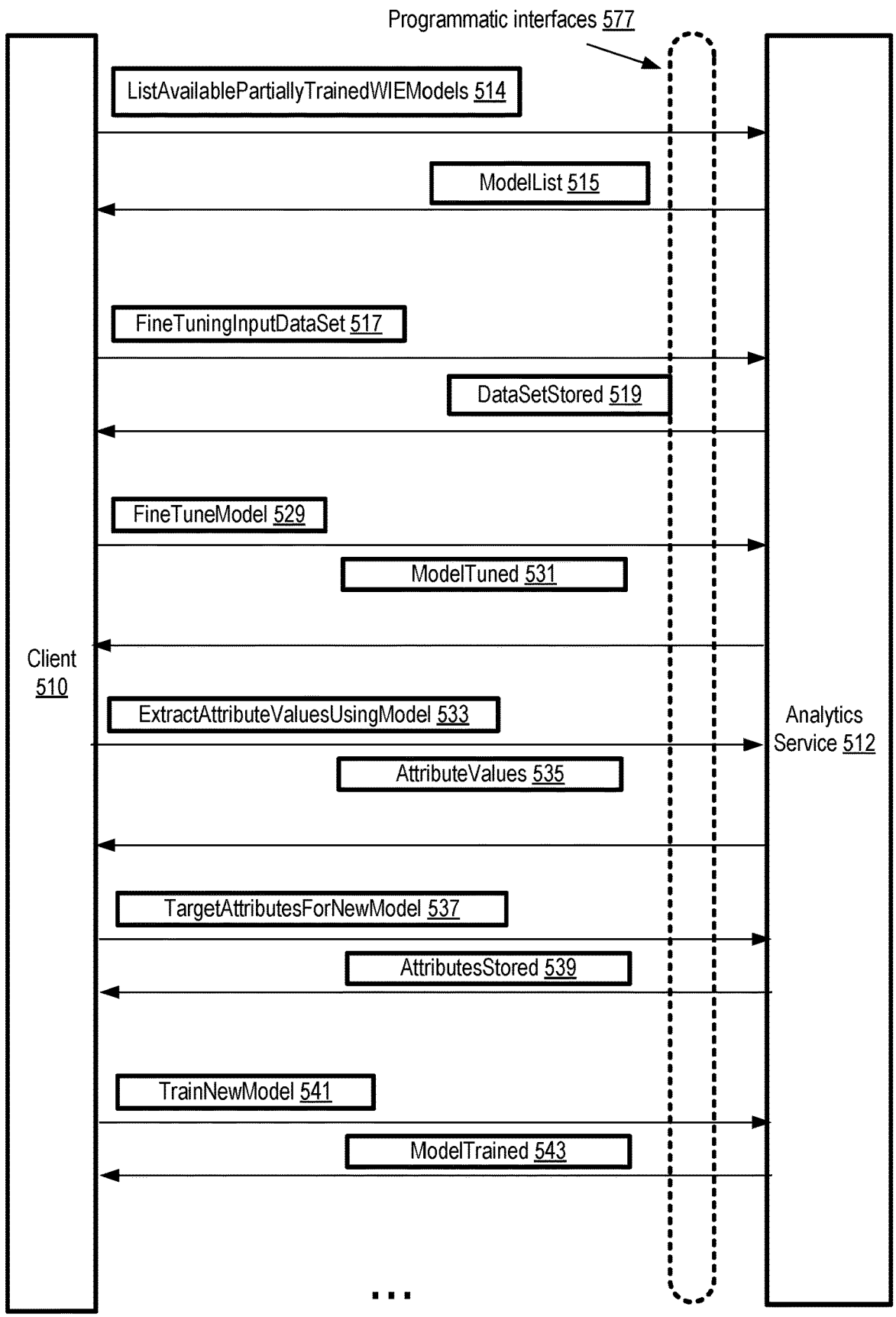
FIG. 5 illustrates example programmatic interactions associated with multimodal extraction of web page information by an analytics service, according to at least some embodiments.

FIG. 5 illustrates example programmatic interactions associated with multimodal extraction of web page information by an analytics service, according to at least some embodiments. An analytics service 512, similar in functionality to analytics service 102 of FIG. 1, may implement a set of programmatic interfaces 577 in the depicted embodiment, which may be used by clients 510 of the analytics service to submit messages/requests pertaining to automated web information extraction and to receive corresponding responses. The programmatic interfaces 577 may include, among others, web-based consoles, command-line tools, graphical user interfaces, application programming interfaces (APIs) and the like in different embodiments.

In some embodiments, the analytics service 512 may store a collection of partially trained models for web information extraction, which can be fine tuned for specific sets of target attributes using techniques similar to those described above. The preliminary training phases of the partially-trained models may have been completed, and the parameters learned during the preliminary training may have enabled the models to generate representations of web page contents that may be usable for a variety of purposes. A client 510 may submit a ListAvailablePartiallyTrainedWIEModels 514 to determine the set of partially trained web information extraction models that can be fine tuned if desired in the embodiment depicted in FIG. 5. In response, the set of available models may be indicated in a ModelList response message 515.

A client desiring to fine tune a partially-trained model may submit a FineTuningInputDataSet message 517 indicating the input data to be used for the fine tuning. In at least some cases, the client may label the web pages of the data set, specifying for example the target attributes whose values are represented in respective HTML elements of the web pages. The data set may be saved at a repository of the analytics service, and a DataSetStored message 519 may be sent to the client. To initiate the fine tuning, a FineTuneModel request 529 may be submitted via the programmatic interfaces 577. After the fine tuning has been completed, a ModelTuned message 531 may be sent to the client in the depicted embodiment.

An ExtractAttribute ValuesUsingModel request 533 may be submitted in some embodiments by a client, specifying a fully-trained model and a set of target attributes whose values are to be extracted from a specified group of one or more web pages. The model may be run at the analytics service, with the web pages indicated by the client provided as input. The output of the model may include the values identified for the target attributes from the web pages, and the values may be sent to one or more destinations indicated by the client. An Attribute Values message 535 comprising the extracted values may be sent to the client, for example.

In one embodiment, a client 510 may wish to train an attribute value extraction model from scratch using the resources of the analytics service, e.g., instead of simply fine tuning a partially-trained model. In such a scenario, the client may submit a TargetAttributesForNewModel request 537, indicating a set of target attributes to be extracted, and one or more data sets comprising web pages with values of the target attributes. The target attribute information may be saved at the analytics service, and an AttributesStored message 539 may be sent to the client. In response to a subsequent TrainNewModel request 541 from the client, both the preliminary phase and the fine tuning phase may be performed for a new model, and a ModelTrained message 543 may be sent to the client after the model training is complete. In some embodiments, programmatic interactions other than those shown in FIG. 5 may be supported by an analytics service with respect to the extraction of information from web pages using multi-modal machine learning techniques.

Figure 6:
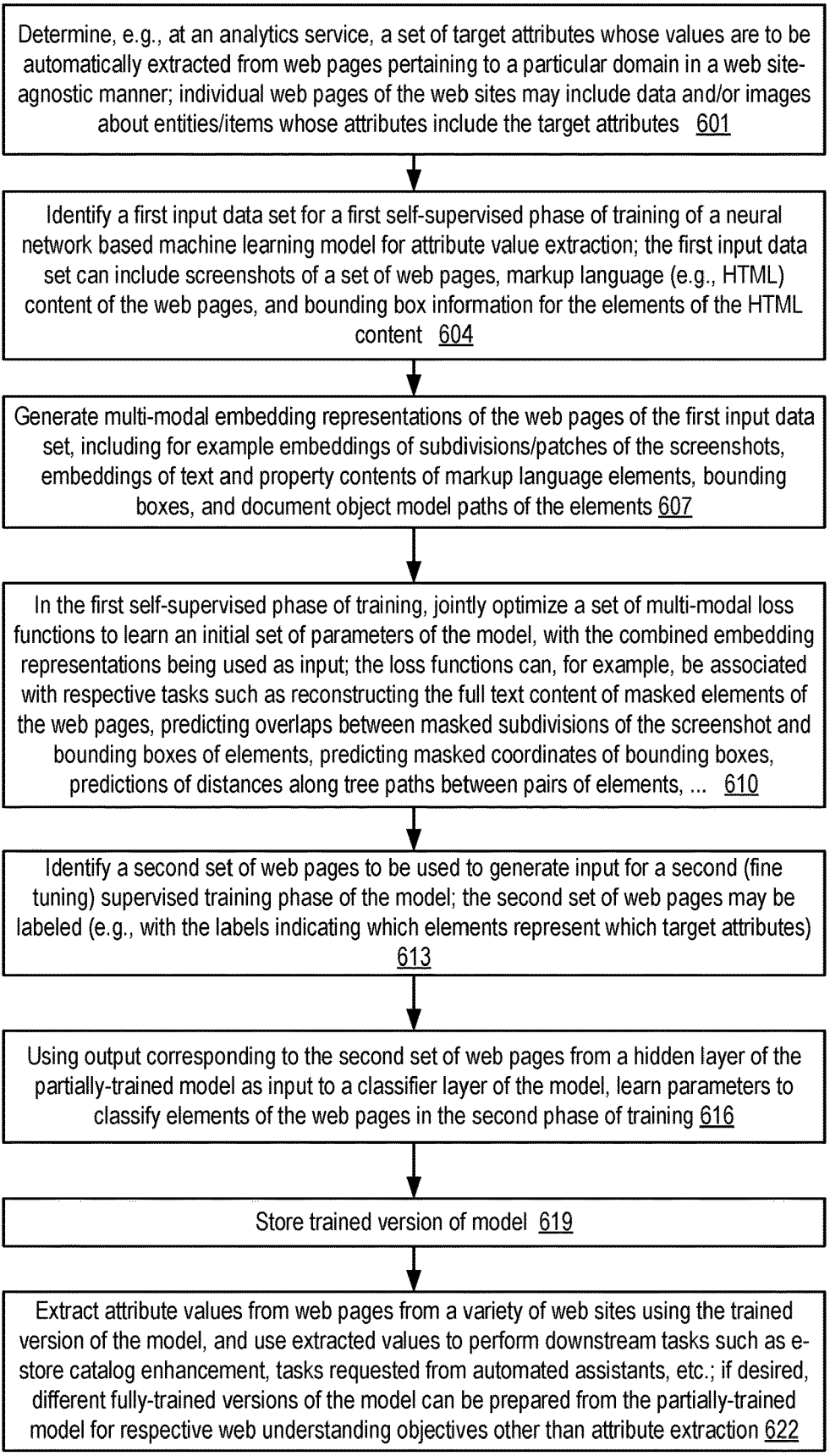
FIG. 6 is a flow diagram illustrating aspects of operations that may be performed to extract information using multimodal techniques from web pages, according to at least some embodiments.

FIG. 6 is a flow diagram illustrating aspects of operations that may be performed to extract information using multi-modal techniques from web pages, according to at least some embodiments. As shown in element 601, a set of target attributes whose values are to be automatically extracted from web pages pertaining to a particular domain from various web sites in a web site agnostic manner may be determined, e.g., at an analytics service. Individual web pages of the web sites may include data and/or images of entities whose attributes include the target attributes.

A first input data set for a first (self-supervised) phase of training of a neural network based machine learning model for attribute value extraction may be identified or prepared in various embodiments (element 604). The first input data set may include, for example, screenshots of a first set of unlabeled web pages pertaining to the domain, markup language (e.g., HTML) content of the web pages, and bounding box information for the elements of the HTML content.

Multi-modal embedding representations of the web pages of the first input data set may be generated in the depicted embodiment (element 607). The representations may include embeddings of subdivisions/patches of the screenshots, as well as embeddings of text and property contents of markup language elements, bounding boxes, and document object model paths of the elements in some implementations.

The first self-supervised phase of training may then be performed (element 610). In this phase, a set of multi-modal loss functions corresponding to a plurality of prediction tasks that take interactions among different modalities may be jointly optimized to learn an initial set of parameters of the model, with the combined embedding representations being used as input. The loss functions may, for example, be associated with tasks such as reconstructing the full text content of masked elements of the web pages, predicting overlaps between masked subdivisions of the screenshot and bounding boxes of markup language elements, predicting masked coordinates of bounding boxes, predictions of distances along tree paths between pairs of markup language elements, and so on.

A second set of web pages to be used to generate input for a second (fine tuning) training phase of the model, which may comprise supervised learning, may be identified or obtained in the depicted embodiment (element 613). The second input data set may include web pages that are labeled, with the labels indicating the markup language elements of the web pages which represent various target attributes whose values are to be extracted.

Using output corresponding to the second set of web pages from a hidden layer of the partially-trained model as input to a classifier layer of the model, parameters to classify elements of the web pages may be learned in the second phase of training (element 616). A fully-trained version of the model, obtained after both phases are completed, may be stored (element 619), e.g., at a repository of the analytics service.

Attribute values from web pages from a variety of web sites may be extracted using the trained version of the model, and used to perform a variety of downstream tasks such as e-store catalog enhancement, tasks requested from automated intelligent assistants, etc. (element 622). Note that if desired, different fully-trained versions of the model can be prepared from the partially-trained models for respective web understanding objectives other than attribute extraction in at least some embodiments. For each specific web understanding goal, a set of labeled web pages pertinent to the web understanding goal may be obtained, and the fine tuning phase of the model may be executed without having to redo the initial phase in such embodiments. The loss function of the fine tuning phase may be chosen to correspond to the specific objective.

It is noted that in various embodiments, some of the operations shown in the flow diagram of FIG. 6 may be implemented in a different order than that shown in the figure, or may be performed in parallel rather than sequentially. Additionally, some of the operations shown in FIG. 6 may not be required in one or more implementations.

Figure 7:
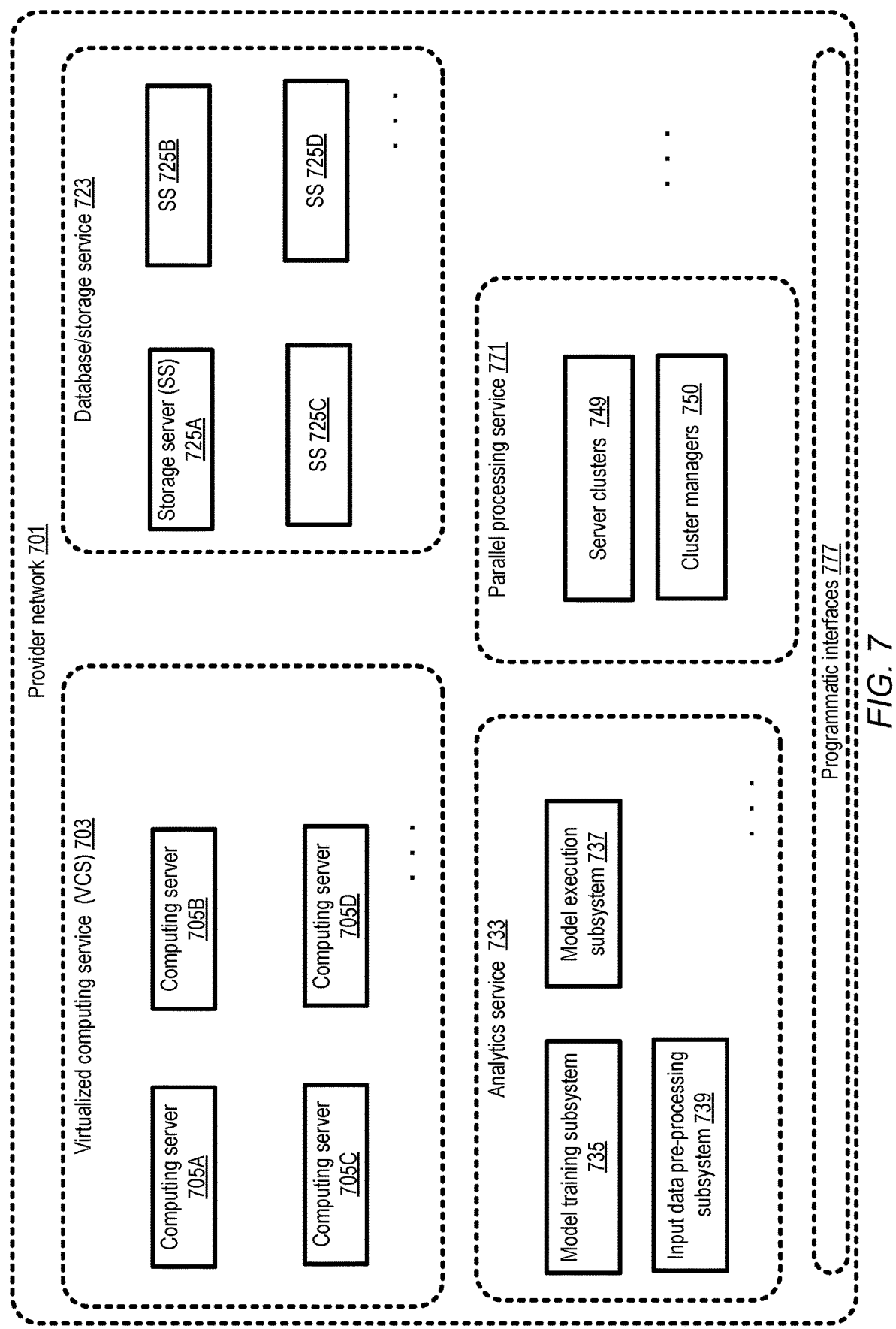
FIG. 7 illustrates an example provider network at which an analytics service which can be used for extracting information from web pages may be implemented, according to at least some embodiments.

In some embodiments, as mentioned earlier, an analytics service that can be utilized to train and execute machine learning models for web page information extraction may be implemented as part of a cloud provider network or cloud computing environment. FIG. 7 illustrates an example provider network at which an analytics service which can be used for extracting information from web pages may be implemented, according to at least some embodiments. In the depicted embodiment, provider network 701 may comprise resources used to implement a plurality of services, including for example a virtualized computing service (VCS) 703, a database/storage service 723, a parallel processing service 771 as well as an analytics service 733 (which may also be referred to as a machine learning service). The analytics service 733, similar in features and functionality to analytics service 102 of FIG. 1, may comprise a model training subsystem 735, a model execution subsystem 737, as well as an input pre-processing subsystem 739. The input pre-processing subsystem may include embedding generation tools similar to those shown in FIG. 1, the model training resources may include pre-training resources as well as fine tuning resources of the kind shown in FIG. 1. The model execution subsystem may include trained model execution resources similar to those depicted in FIG. 1.

Components of a given service of a provider network may utilize components of other services in the depicted embodiment—e.g., for some input pre-processing tasks, model training tasks or model execution tasks, virtual machines or compute instances implemented at computing servers such as 705A-705D of the virtualized computing service 703 may be used by the analytics service, training data sets and model execution results may be stored at storage servers 725 (e.g., 725A-725D) of database/storage service 723, and so on.

For some types of complex or large-scale tasks initiated at the analytics service 733, server clusters 749 may be utilized with the help of cluster managers 750 of the parallel processing service 771 in one embodiment. The cluster managers 750 may for example assign particular clusters to clients, keep track of cluster health and take administrative actions such as replacing failed or poorly-performing servers, and the like. The server clusters may themselves comprise compute instances of the VCS in some cases. Individual ones of the services shown in FIG. 7 may implement a respective set of programmatic interfaces 777 which can be used by external and/or internal clients (where the internal clients may comprise components of other services) in the depicted embodiment. In at least some embodiments, resources of a cloud provider network may not be required for the kinds of techniques introduced above; instead, for example, a standalone set of tools may be used.

A provider network 701 can be formed as a number of regions in some embodiments, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN (virtual private network) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, an analytics service may be implemented at least in part using an edge location of the provider network instead of or in addition to regional data centers. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network.

The cloud provider network may implement various computing resources or services, which may include an analytics service, a VCS, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

A virtualized computing service (VCS) 703 of the cloud provider network may offer virtual compute instances (also referred to as virtual machines, or simply "instances") with varying computational and/or memory resources in various embodiments. In one embodiment, each of the virtual compute instances may correspond to one of several instance types or families, and instances of any of several families may be employed for the web information extraction model preparation and execution workflow. An instance type may be characterized by its hardware type, computational resources (e.g., number, type, and configuration of central processing units [CPUs] or CPU cores, hardware accelerators for various tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. Various types of compute instances, some of which may have access to hardware accelerators (e.g., incorporated within cards connected via Peripheral Component Interconnect—Express (PCIe) links to the primary processors of virtualization servers at which the compute instances are run) may be used to prepare and run web information extraction models in different embodiments.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Machine learning models and other tools used for web information extraction may be run using containers in at least some embodiments.

The traffic and operations of the cloud provider network, and individual services such as the analytics service, may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Figure 8:
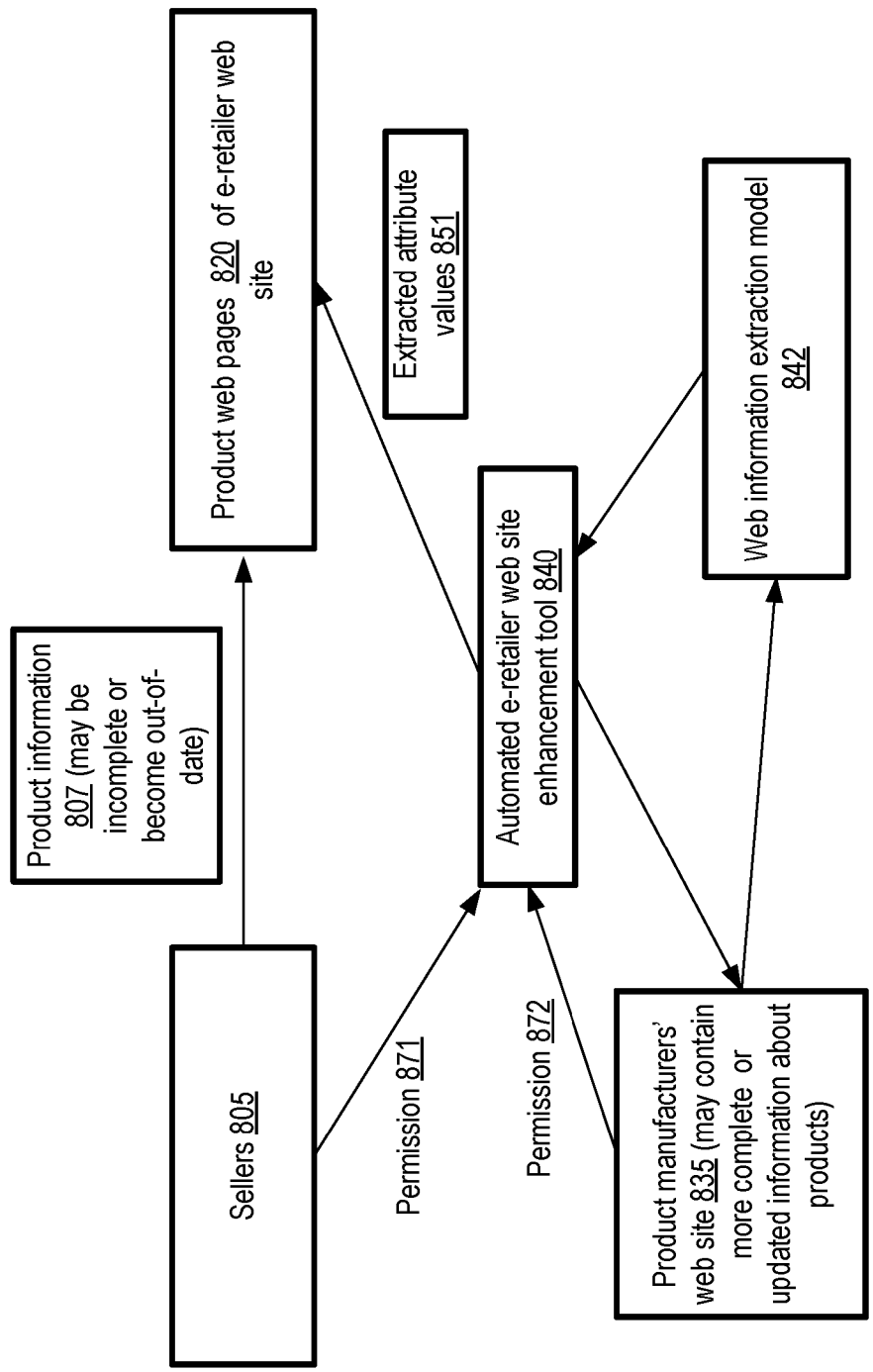
FIG. 8 illustrates an example use of information extracted from one set of web pages to enhance content of other web pages, according to at least some embodiments.

As mentioned earlier, the web information extraction techniques introduced herein may be employed for a variety of applications. FIG. 8 illustrates an example use of information extracted from one set of web pages to enhance content of other web pages, according to at least some embodiments. In the depicted example scenario, an e-retailer may provide programmatic interfaces enabling third-party sellers 805 (or resellers) of various items to provide product information 807 which can be shown on product web pages 820 of the e-retailer's web site. The product information provided by a seller may not always be complete, in the sense that the seller may only be required to provide values for a few key attributes of the product being sold, such as the name, cost, size, color, etc., without providing comprehensive details of the product. Furthermore, it may sometimes be the case that the product may be manufactured or created by some entity other than the seller, and some of the information about the product may be modified by the manufacturer or creator after the product information is provided to the e-retailer by the seller.

The product manufacturer's web site 835 (if such a web site exists) may contain more complete or up-to-date information about the product being sold by the seller via the e-retail web site. In the scenario depicted in FIG. 8, an automated e-retailer web site enhancement tool 840 may utilize a web information extraction model 842 of the kind introduced above to analyze the content of the product manufacturer's web site. Prior to utilizing the model 842, permission 871 may be obtained from the seller (e.g., verifying that the seller is willing to have the product information enhanced) in various embodiments. Furthermore, permission 872 may be obtained from the product manufacturer in some embodiments to ensure that it is acceptable to extract information about products from the manufacturer's web site. In response to a query from the tool, the model may be able to extract attribute values for various product attributes of interest from the product manufacturer's web site and provide them to the tool. The extracted attribute values 851 for the products can be used to improve/enhance (e.g., by filling in missing information) or verify the contents of the e-retailer web site pages. This process may be referred to as catalog enrichment or catalog enhancement with respect to the catalog of products offered by the e-retailer and presented to customers via the e-retailer's web site.

Figure 9:
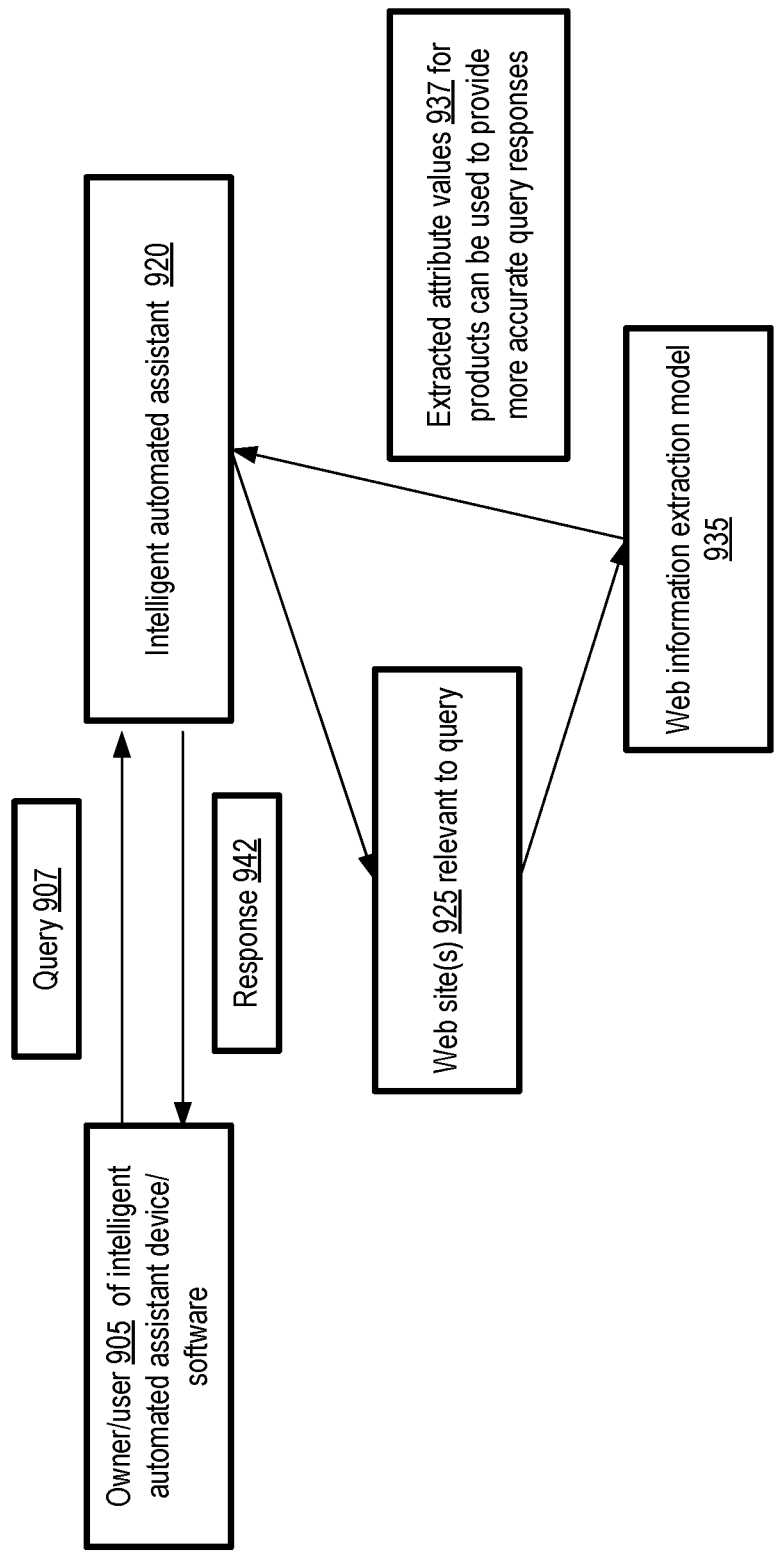
FIG. 9 illustrates an example use of information extracted from web pages to improve the accuracy of query responses provided by automated assistants, according to at least some embodiments.

FIG. 9 illustrates an example use of information extracted from web pages to improve the accuracy of query responses provided by automated assistants, according to at least some embodiments. In the depicted example scenario, an owner/user 905 of an intelligent automated assistant device or software may send a query 907 pertaining to some domain of knowledge to the intelligent automated assistant 920. The query may be expressed verbally using natural language in at least some cases.

Using natural language understanding programs or models, in various embodiments the automated assistant may be able to determine the domain to which the query pertains, and identify one or more publicly-accessible web site(s) 925 (web sites that do not require permission to be obtained by viewers prior to access) likely to comprise information relevant to preparing a response to the query. One or more web information extraction models 935 of the kind introduced earlier may be utilized to extract information such as attribute values from the web site pages. The intelligent automated assistant 920 may, in response to receiving query 907 from the owner/user, generate and submit its own queries to the web information extraction model, indicating the web site(s) 925. The extracted attribute values 937 or other information obtained by the model in response to the query or queries from the automated assistant may be used by the automated assistant to prepare an accurate response 942 to the query from the owner/user in the depicted example scenario.

Figure 10:
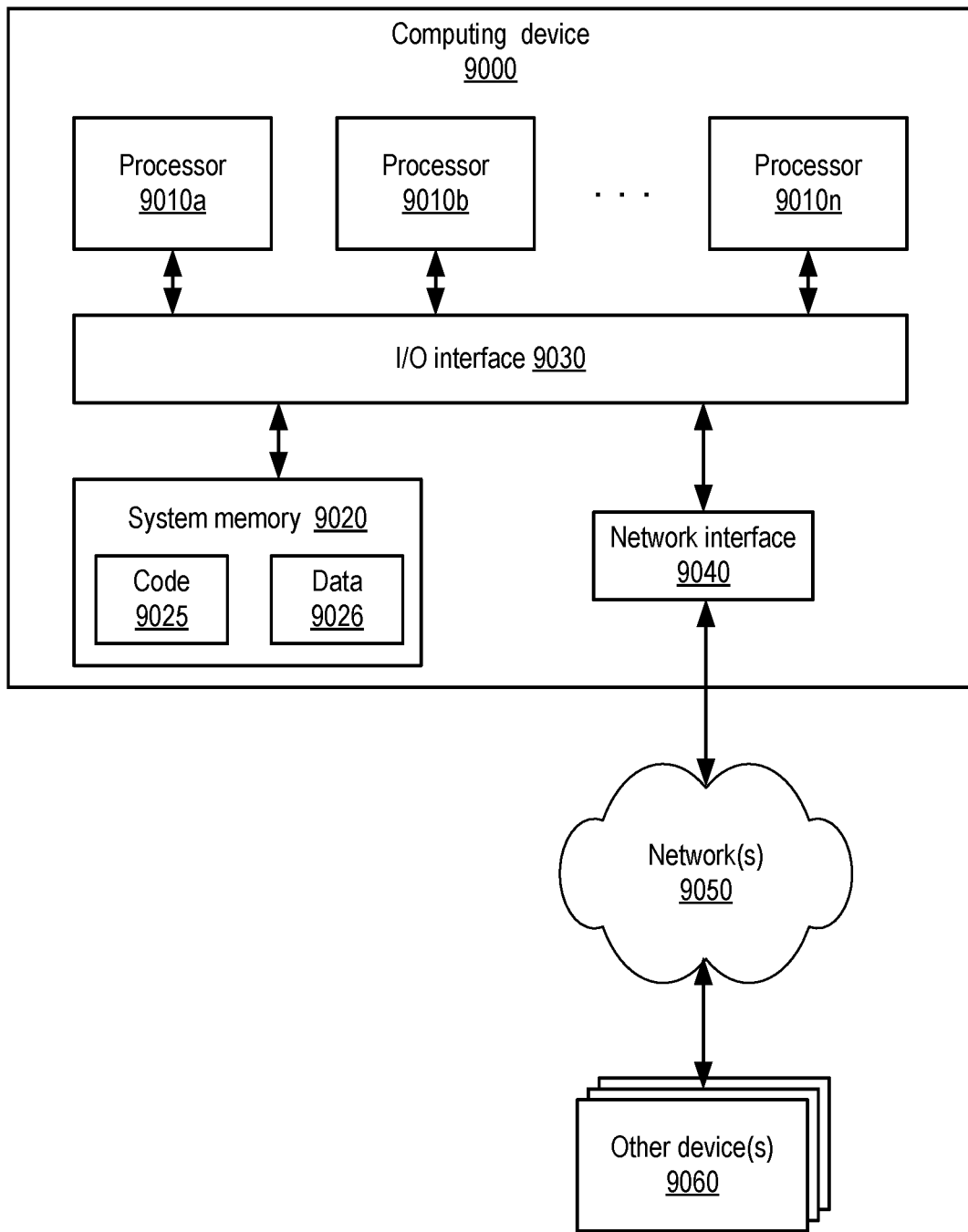
FIG. 10 is a block diagram illustrating an example computing device that may be used in at least some embodiments.

In at least some embodiments, a server that implements the types of techniques described herein (e.g., various functions of an analytics service and/or other services of a provider network), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices;
   wherein the one or more computing devices include instructions that upon execution on or across the one or more computing devices:
     determine, at an analytics service of a cloud provider network, a set of target attributes for which respective values are to be extracted from web pages of one or more web sites, wherein individual ones of the web pages comprise data about one or more entities whose attributes are included in the set of target attributes;
     prepare, at the analytics service, a neural network based model to be used to extract the respective values, wherein the neural network based model comprises a transformer encoder, and wherein preparation of the neural network based model comprises:
       identifying an input data set for a first training phase of the neural network based model, wherein the input data set comprises, corresponding to a first web page of a first plurality of web pages, at least (a) a screenshot of the first web page, (b) markup language content of the first web page, wherein the markup language content indicates a plurality of elements arranged in accordance with a document model, wherein a particular element of the plurality of elements comprises a value of an attribute of the set of target attributes, and (c) a representation of respective bounding boxes corresponding to at least some elements of the plurality of elements, and wherein the input data set does not comprise a label for the first web page;

generating respective multi-modal embedding representations of the first plurality of web pages, wherein a multi-modal embedding representation of the first web page comprises embeddings of at least (a) respective subdivisions of the screenshot of the first web page, (b) text content of respective elements of the plurality of elements of the first web page, (c) respective bounding boxes included in the input data set for the first web page and (d) respective document model paths of individual elements of the plurality of elements of the first web page;

conducting the first training phase of the neural network based model, wherein the first training phase comprises self-supervised learning of the transformer encoder, and wherein in the first training phase, parameters of the transformer encoder are learned by jointly optimizing a plurality of multi-modal loss functions corresponding to respective tasks, wherein the plurality of multi-modal loss functions includes:
- a first loss function associated with a first task which comprises reconstructing text of a masked element of the plurality of elements of the first web page, and
- a second loss function associated with a second task comprising predicting an overlap between (a) a masked subdivision of the screenshot of the first web page and (b) a bounding box of an element of the plurality of elements;

conducting a second training phase of the neural network based model, wherein the second training phase comprises supervised learning to classify elements of web pages, wherein input of the second training phase comprises output of a hidden layer of the transformer encoder, wherein the output of the hidden layer corresponds to a second plurality of web pages, and wherein at least some parameters of the hidden layer were learned in the first training phase; and generate, at the analytics service, a response to a query pertaining to a particular web page, wherein the response to the query is based at least in part on (a) classification, by a version of the neural network based model obtained after the second training phase, of a particular element of the particular web page, and (b) a determination, from the particular element, of a value of a particular target attribute of the set of target attributes.

2. The system as recited in claim 1, wherein the one or more computing devices include further instructions that upon execution on or across the one or more computing devices:
transmit the response to the query to a tool configured to utilize the response to modify contents of another web page.

3. The system as recited in claim 1, wherein the one or more computing devices include further instructions that upon execution on or across the one or more computing devices:
transmit the value of the particular target attribute to an automated assistant from which the query is received, wherein the automated assistant is configured to transmit the query to the analytics service in response to a request directed to the automated assistant.

4. The system as recited in claim 1, wherein the particular web page is part of a first web site of the one or more web sites, and wherein the one or more computing devices include further instructions that upon execution on or across the one or more computing devices:
extract, using another classification result obtained from the version of the neural network based model, a value of the particular target attribute from another web page, wherein the other web page is part of a second web site, and wherein the value is extracted from the other web page without retraining the neural network based model.

5. The system as recited in claim 1, wherein the plurality of multi-modal loss functions includes one or more of: (a) a loss function associated with a third task comprising prediction of a coordinate of a bounding box of another element of the plurality of elements or (b) a loss function associated with a fourth task comprising prediction of a distance, within a tree of markup language elements of the first web page, between a pair of markup language elements.

6. A computer-implemented method, comprising:
preparing a first machine learning model to extract information from web pages, wherein the preparing includes:
generating respective embedding representations of a first plurality of web pages, wherein an embedding representation of a first web page of the first plurality of web pages comprises embeddings of at least (a) respective subdivisions of a screenshot of the first web page, (b) content of individual markup language elements of a plurality of markup language elements of the first web page, and (c) respective bounding boxes of the individual markup language elements;

conducting a first training phase of the first machine learning model, wherein in the first training phase, the respective embedding representations of the first plurality of web pages are used as input, and one or more parameters of the first machine learning model are learned by jointly optimizing a plurality of loss functions, wherein the plurality of loss functions includes:
- a first loss function associated with reconstructing text of a masked markup language element of the plurality of markup language elements of the first web page, and
- a second loss function associated with predicting overlap between (a) a masked subdivision of the screenshot of the first web page and (b) a bounding box of a markup language element of the plurality of markup language elements;

conducting a second training phase of the first machine learning model, wherein the second training phase comprises learned classification of markup language elements of web pages, wherein input of the second training phase comprises output, corresponding to a second plurality of web pages, of a hidden layer of the first machine learning model; and extracting, using a classification result obtained from a version of the first machine learning model obtained after the second training phase is complete, a value from a particular portion of a particular web page.

7. The computer-implemented method as recited in claim 6, further comprising:

automatically modifying, based at least in part on the value from the particular portion of the particular web page, contents of another web page.

8. The computer-implemented method as recited in claim 6, further comprising:
receiving, by an automated assistant, a query pertaining to at least the particular web page, wherein the value of the particular portion of the particular web page is extracted in response to the query.

9. The computer-implemented method as recited in claim 6, wherein the particular web page is part of a first web site, the computer-implemented method further comprising:
extracting, using another classification result obtained from the version of the first machine learning model obtained, a value from another portion of another web page, wherein the other web page is part of a second web site, and wherein the value from the other portion is extracted without retraining the first machine learning model.

10. The computer-implemented method as recited in claim 6, wherein embedding representation of the first web page comprises embeddings of respective document model paths of individual markup language elements of the plurality of markup language elements of the first web page.

11. The computer-implemented method as recited in claim 6, wherein the plurality of loss functions includes one or more of: (a) a loss function associated with predicting a coordinate of a bounding box of another markup language element of the plurality of markup language elements or (b) a loss function associated with prediction of a distance, within a tree of markup language elements of the first web page, between a pair of markup language elements.

12. The computer-implemented method as recited in claim 6, further comprising:
determining, based at least in part on a first set of input received via a programmatic interface, a first set of attributes whose values are to be extracted from one or more web pages, wherein the first machine learning model is prepared to extract values of the first set of attributes;
determining, based at least in part on a second set of input received via the programmatic interface, a second set of attributes whose values are to be extracted from one or more web pages; and
preparing, to extract values of the second set of attributes, a second machine learning model.

13. The computer-implemented method as recited in claim 6, further comprising:
receiving, via one or more programmatic interfaces of a cloud provider network, a request to analyze the particular web page, wherein the value is extracted in response to the request to analyze the particular web page.

14. The computer-implemented method as recited in claim 6, further comprising:
receiving, via one or more programmatic interfaces of a cloud provider network, a request to train the first machine learning model, wherein at least the second training phase is conducted in response to the request to train the machine learning model.

15. The computer-implemented method as recited in claim 6, further comprising:
receiving, via one or more programmatic interfaces of a cloud provider network, an indication of at least a portion of the second plurality of web pages.

16. One or more non-transitory computer-accessible storage media storing program instructions that when executed on or across one or more processors:
prepare a machine learning model for extracting information from web pages, wherein the preparing includes:
generating respective embedding representations of a first plurality of web pages, wherein an embedding representation of a first web page of the first plurality of web pages comprises embeddings of at least (a) respective subdivisions of a screenshot of the first web page, and (b) respective bounding boxes of one or more markup language elements of the first web page;
conducting a first training phase of the machine learning model, wherein in the first training phase, the respective embedding representations of the first plurality of web pages are used as input, and one or more parameters of the machine learning model are learned by jointly optimizing a plurality of loss functions associated with respective prediction tasks, including a first task comprising markup language element prediction task and a second task comprising prediction of overlap between bounding boxes and screenshot subdivisions;
conducting a second training phase of the machine learning model, wherein input of the second training phase comprises output of a hidden layer of the machine learning model, wherein parameters of the hidden layer were learned in the first training phase, and wherein a loss function of the second training phase is optimized to achieve a target web information extraction objective; and
store a trained version of the machine learning model obtained after the second training phase is completed.

17. The one or more non-transitory computer-accessible storage media as recited in claim 16, storing further program instructions that when executed on or across the one or more processors:
utilize the trained version to extract information from a particular web page; and
transmit the information to a tool configured to utilize the information to modify contents of another web page.

18. The one or more non-transitory computer-accessible storage media as recited in claim 16, storing further program instructions that when executed on or across the one or more processors:
utilize the trained version to extract information from a particular web page; and
transmit the information to an automated assistant configured to utilize the information to respond to a query.

19. The one or more non-transitory computer-accessible storage media as recited in claim 16, storing further program instructions that when executed on or across the one or more processors:
extract, using the trained version, respective sets of information from a plurality of web sites without retraining the machine learning model.

20. The one or more non-transitory computer-accessible storage media as recited in claim 16, wherein the plurality of loss functions includes one or more of: (a) a loss function associated with predicting a coordinate of a bounding box of a markup language element of the one or more markup language elements or (b) a loss function associated with prediction of a distance, within a tree of markup language elements of the first web page, between a pair of markup language elements.

* * * * *